Oct. 20, 1959     F. A. HOGLAN     2,909,564
PROCESS FOR RECOVERY OF GLUTAMIC ACID
Filed Nov. 29, 1956
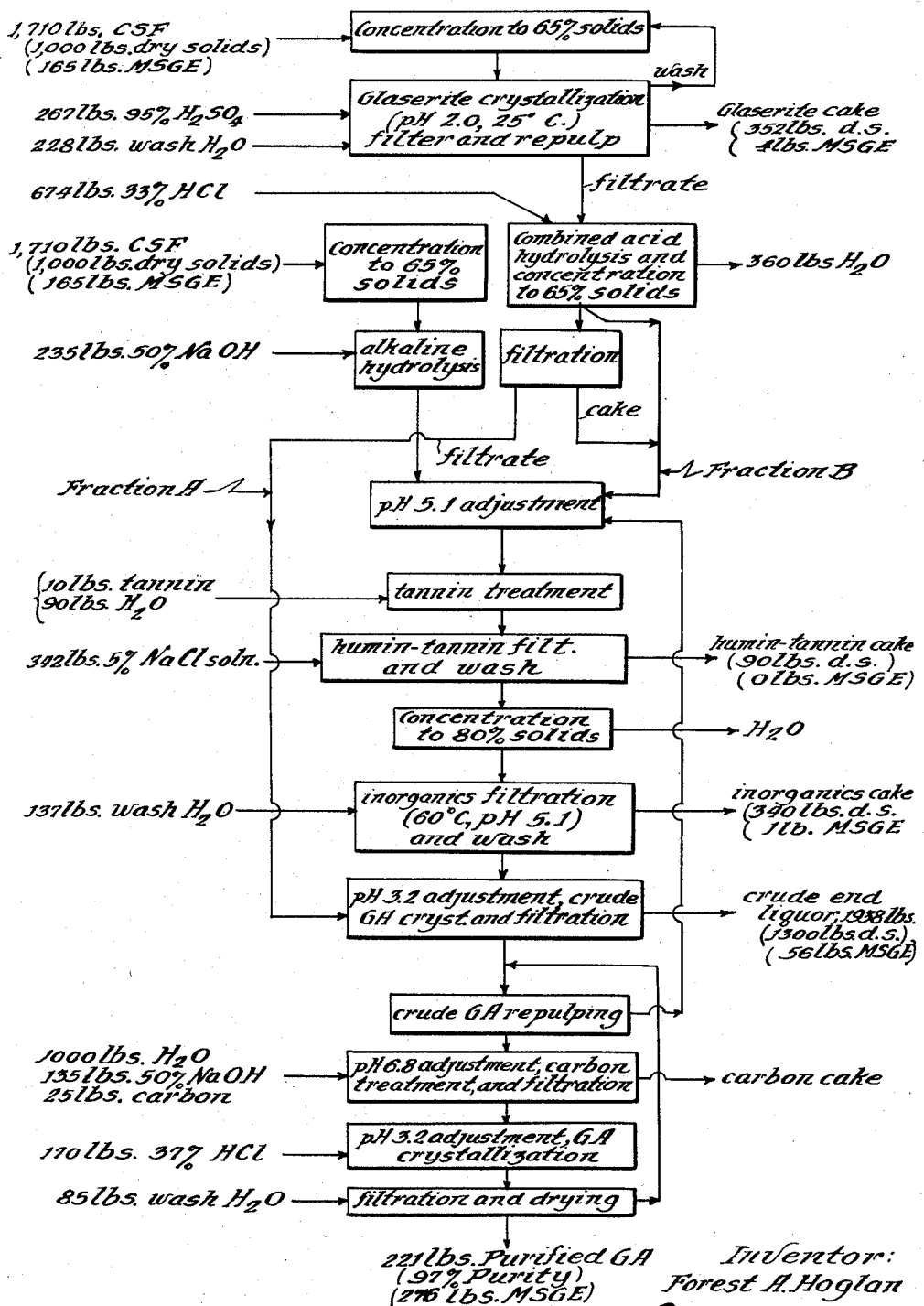

2,909,564

PROCESS FOR RECOVERY OF GLUTAMIC ACID

Forest A. Hoglan, Glenview, Ill., assignor to International Minerals & Chemical Corporation, a corporation of New York Application November 29, 1956, Serial No. 625,038

7 Claims. (Cl. 260—527)

This invention relates to an improved method for the production of glutamic acid, and more particularly to a process for the recovery of glutamic acid values from Steffen's filtrate, thin barium filtrate, vinasse, schlempe, or other form of beet sugar waste liquor.

Glutamic acid exists in beet sugar waste liquors predominantly in the form of its lactam, pyrrolidonecarboxylic acid, which is commonly subjected to hydrolysis by one means or another to obtain glutamic acid therefrom. Hydrolysis under acid conditions offers the advantage of effecting more nearly complete conversion of glutamic acid precursors, but tends to produce severe corrosion of equipment; for this reason alkaline hydrolysis has commonly been adopted by the art. Alkaline hydrolysis is usually carried out at high pH levels in the range of about 12 or above; and inasmuch as the glutamic acid is commonly crystallized from the hydrolyzate at its isoelectric point, pH 3.2, this means that all the alkali contained therein must be neutralized with acid before the crystallization can be carried out. Large quantities of reagents are thus required for the initial hydrolysis and for the neutralization, and the process solutions thereby become heavily loaded with inorganic salts, which must be removed at least in part. It has accordingly been proposed to employ both acid and alkaline hydrolysis on separate portions of waste liquor, and to "co-neutralize" the hydrolyzates with each other to the desired pH level. The co-neutralization process, however, has never been employed on a commercial scale because, as heretofore conceived, it has required that the partially neutralized alkaline hydrolyzate be concentrated to impracticably high solids levels around 90% by weight, or has required that one or more process streams be concentrated under pH conditions promoting the reversion of glutamic acid to pyrrolidonecarboxylic acid.

An object of this invention is to provide a new and improved process for the production and recovery of glutamic acid from beet sugar waste liquors, in particular from Steffen's filtrate.

Another object is to provide a process for recovering glutamic acid from Steffen's filtrate while minimizing corrosion problems.

Another object is to provide a process for recovering glutamic acid from Steffen's filtrate while avoiding the concentration of process streams to excessively high solids contents.

Another object of the invention is to provide a process for recovering glutamic acid from Steffen's filtrate which avoids the concentration of process streams under pH conditions conducive to the reversion of glutamic acid to pyrrolidonecarboxylic acid.

Another object is to provide a new and improved co-neutralization process which avoids the shortcomings of the prior art co-neutralization processes.

These and other objects of the invention will be apparent from the present description and claims.

As an important feature of the present invention, I have found that Steffen's filtrate can be concentrated under acid hydrolysis conditions to produce an acid hydrolyzate which can be used for final adjustment of a partially desalted hydrolyzate to around pH 3.2 without causing material dilution of the latter. It thereby becomes unnecessary to concentrate the partially desalted hydrolyzate, prior to or after desalting, to excessively high levels, as required heretofore in the art; and the mixture of hydrolyzates, having a pH of about 3.2, is immediately ready for crystallization of glutamic acid therefrom.

In accordance with the present invention, I have found that glutamic acid can be efficiently and economically recovered from Steffen's filtrate or the like by a process which includes the following steps. A portion of Steffen's filtrate is hydrolyzed with a non-oxidizing mineral acid, i.e., a mineral acid non-oxidizing under the conditions employed, and is simultaneously or immediately thereafter concentrated as required to produce a solids content in the hydrolyzate between about 60 and about 85% by weight, preferably about 65%. A portion of the acid hydrolyzate is filtered or otherwise treated to remove humin substances, yielding an acidic, humin-free liquor for subsequent use in the process. The humin substances are preferably combined with the unfiltered acid hydrolyzate for subsequent processing. Another portion of Steffen's filtrate is hydrolyzed with alkali, and the alkaline hydrolyzate is co-neutralized with the humin-containing acid hydrolyzate fraction in a proportion to reach a pH between about 4 and about 6. Insoluble material is seperated therefrom, and the co-neutralized hydrolyzates are concentrated and partially desalted, then co-neutralized to a pH of about 3.2 with the humin-free acid hydrolyzate liquor, at which point glutamic acid crystallizes readily from the solution.

In the acid hydrolysis phase of my process, Steffen's filtrate is first treated, if desired, to remove inorganic salts and betaine, and is then hydrolyzed and concentrated, preferably simultaneously, to about 65% solids by heating and distilling in the presence of a non-oxidizing mineral acid, such as sulfuric acid or hydrochloric acid, at a pH below about 1, preferably around 0. The resulting hydrolyzate is divided into two fractions which, for convenience, may be designated as fractions A and B. Fraction A, ordinarily comprising between about 20 and about 80% by volume of the total hydrolyzate, e.g., from about 30 to about 70%, is filtered or otherwise treated to remove humin and other solid materials, and the clear filtrate is reserved for final adjustment of the primary process stream to pH 3.2 just prior to crystallization of glutamic acid. Fraction B is the remainder of the acid hydrolyzate, to which the solids removed from fraction A are added. The actual sizes of the fractions and of the parallel alkaline hydrolysis stream, referred to hereinafter, are adjusted so that the desired pH levels are reached when the specified process streams are mixed.

As a practical matter, I prefer to divide the acid hydrolyzate into two portions, as set forth hereinabove, and to separate the humin materials from only one portion, thereby minimizing the quantity of highly acidic material which must be filtered, centrifuged, or otherwise treated for removal of solids. It will be apparent, however, that the entire acid hydrolyzate can be treated to separate humin substances therefrom, then divided into fractions, and the humin substances added to or treated in conjunction with one such fraction. It is especially convenient in any event to process the entire quantity of humin substances together with a portion of acid hydrolyzate at the first pH adjustment to around pH 4–6, thereby recovering the glutamic acid values therefrom with a minimum of operations. Alternatively, however, the humin solids can be simply water-washed to remove the glutamic acid values and then rejected from the process.

In a further modification of my invention, I may subject only a portion of the acid hydrolyzate to concentration under hydrolysis conditions, then filtering for use, in effect, as fraction A. Or I may subject a separate portion of my starting material to acid hydrolysis, concentration, and filtration for use as fraction A. In either of these embodiments, the portion of acid hydrolyzate corresponding to fraction B is not subjected to concentration prior to the first pH adjustment to pH 4–6.

In the alkaline hydrolysis, Steffen's filtrate is concentrated, if necessary, to about 65% solids, alkalized with sodium hydroxide, potassium hydroxide, or other alkali, and hydrolyzed under conventional conditions. Ordinarily less than about 10% by weight (e.g., 4 to 8%) of alkali is employed, and the hydrolysis is complete at about 60 to about 100° C. in around 1 to 4 hours (e.g., 2¼ hours at 85° C.).

The alkaline hydrolyzate is then co-neutralized with fraction B to reach a pH between about 4 and 6, preferably between about 4.5 and about 5.5. The resulting solution is commingled with an aqueous solution of tannin or lignin to precipitate humin and other impurities, which are removed by filtration. The purified liquid is concentrated to between about 65 and 85% by weight of dry solids, and the resulting crop of inorganic salts is separated at a temperature of 60° C. or above. The partially desalted liquor is thereafter co-neutralized to a pH between about 2.5 and about 3.5 with fraction A. The co-neutralized material is sufficiently high in concentration to permit effective crystallization of glutamic acid therefrom, which is carried out by cooling, seeding if desired, and holding at ordinary or somewhat reduced temperature for 1 to 5 days or longer until crystal growth has substantially ceased. The glutamic acid is separated from the crystallization slurry by centrifugation, filtration, or the like, and is purified by conventional means.

My invention will be more fully understod from the following detailed embodiment thereof, to be read in conjunction with the attached drawing.

A beet sugar waste liquor produced by either the barium or calcium treatment of beet sugar molasses (1,710 pounds total weight, containing 1,000 pounds total dry solids comprising 165 pounds of glutamic acid values calculated as monosodium glutamate, hereinafter referred to as "monosodium glutamate equivalent" or "MSGE") is concentrated to a specific gravity between about 1.2 and about 1.4, preferably about 65% solids by weight. Sulfuric acid (267 pounds of 95% $H_2SO_4$) is added to give a pH between about 1.5 and about 2.5, preferably about 2.0. Acid of lower concentration can be used, but is preferably avoided since it would undesirably dilute the liquor. The temperature is held below about 70° C. during addition of the acid in order to minimize hydrolysis of glutamic acid precursors at this point, with consequent loss of glutamic acid values with the inorganic salts precipitated by the acid. The acidified liquor is cooled to a temperature between about 0 and about 50° C., e.g., 25° C., and inorganic sulfate salts (352 pounds of dry solids, 4 pounds MSGE) comprising predominantly glaserite ($Na_2SO_4 \cdot 3K_2SO_4$) are crystallized and separated therefrom. This separation of salts is conveniently carried out by use of a filter press, basket centrifuge, or the like. The salts are washed with 228 pounds of water, and the washings are channeled to incoming beet sugar waste liquor.

The salt-depleted liquor is then hydrolyzed under acid conditions. Concentrated hydrochloric acid (674 pounds of 33% HCl) is added to a pH below about 1, preferably about 0, and the hydrolysis is carried out with simultaneous distillation at a temperature between about 100 and about 125° C. for about ¼ to about 4 hours, preferably about 2 hours, until water has been distilled therefrom in sufficient quantity (360 pounds) to restore the solids concentration to the desired level, e.g., about 65% by weight.

The resulting hydrolyzate is split into two streams, one of which is subjected to filtration, centrifugation, or the like to separate solids therefrom, comprising largely humin. The filtrate, hereinafter termed "fraction A," is employed later in the process for pH adjustment prior to the glutamic acid crystallization step. The filter cake is combined with the unfiltered acid hydrolyzate to form fraction B, which is used for co-neutralization of alkaline hydrolyzate, as described below.

An equal quantity of the Steffen's filtrate (1,710 pounds total weight, containing 1,000 pounds total dry solids comprising 165 pounds MSGE) is subjected to alkaline hydrolysis. For this purpose 235 pounds of aqueous 50% sodium hydroxide are added thereto to produce a pH of about 13 or higher, and the mixture is heated to a temperature betwen about 75 and about 100° C. for a period of about one-half to about 4 hours, preferably around 85° C. for about 2¼ hours. The alkaline hydrolyzate is cooled and combined with a sufficient quantity of fraction B to reach a pH between about 4 and about 6, preferably about 5.1. Impurities are removed therefrom by treatment with 100 pounds of aqueous 10% tannin solution. The resulting humin-tanning cake is filtered off, washed with 342 pounds of aqueous 5% sodium chloride solution, and discarded. The cake generally contains about 90 pounds of dry solids, and is substantially free from monosodium glutamate equivalent.

The purified liquid is next subjected to concentration under reduced pressure to approximately 80% solids content. During this operation a large proportion of the inorganic materials contained therein are precipitated. These materials are filtered off at about 60° C., washed with 137 pounds of water, and rejected. The cake contains about 340 pounds of dry solids, including one pound of MSGE. The concentrated, filtered solution is adjusted to pH 3.2 by addition of a sufficient quantity of fraction A (the filtered acid hydrolyzate). The adjusted solution is cooled to a temperature between about 0 and about 30° C., seeded if desired with a small quantity of glutamic acid crystals, and allowed to stand with gentle stirring for about 5 days to allow crystallization of glutamic acid to reach substantial completion. The crude glutamic acid is separated by filtration, leaving a crude end liquor weighing 1,938 pounds and containing 1,300 pounds of dry solids, including 56 pounds of MSGE.

The crude glutamic acid crystals are washed by repulping with an aqueous glutamic acid crystallization liquor from later in the process, then filtering, and recycling the filtrate to the coneutralization step earlier in the process wherein alkaline hydrolyzate and fraction B were combined to reach pH 4 to 6.

The washed glutamic acid crystals are dissolved in a mixture of 1,000 pounds of water and 135 pounds of aqueous 50% sodium hydroxide solution to reach pH 6.8. To the resulting solution of monosodium glutamate are added 25 pounds of activated carbon, and the mixture is stirred at about 60° C. for a short while, suitably about one-half hour, after which the carbon is filtered off, washed, and discarded. A considerable improvement in color is achieved thereby. The purified solution is adjusted to pH 3.2 by adding 170 pounds of 37% hydrochloric acid. Purified glutamic acid crystallizes rapidly therefrom and the crystallization is ordinarily allowed to proceed at somewhat reduced temperatures for about 24 hours or less. The glutamic acid is filtered off, washed with 85 pounds of water, and dried. The washings are employed to wash the crude glutamic acid crystals from the initial crystallization step. The end product of the process is 221 pounds of glutamic acid having a purity of 97% or more, equivalent to 276 pounds of monosodium glutamate.

The following specific example will more clearly illustrate my invention. All quantities are in parts or percentages by weight unless otherwise specified.

Example

*Alkaline hydrolysis.*—1,000 parts of concentrated Steffen's filtrate containing 586 parts of solids were concentrated under reduced pressure to 903 parts, containing 65% solids. To the concentrate were added 137 parts of aqueous 50% sodium hydroxide solution with stirring, and the mixture was heated rapidly to 85° C. and held at this temperature for 2¼ hours. At the end of this time, the resulting hydrolyzate was cooled rapidly to approximately 30° C.

*Glaserite removal.*—A mixture of 1,000 parts of concentrated Steffen's filtrate and 250 parts of glaserite cake wash water from a previous cycle was concentrated to 1,100 parts, containing 65% solids. To the concentrate were slowly added 187 parts of 96% sulfuric acid with stirring, during which procedure inorganic salts consisting largely of glaserite ($Na_2SO_4 \cdot 3K_2SO_4$) crystallized. The resulting slurry was filtered and the cake was washed with 250 parts of water, the wash water being collected and saved for treatment in the next process cycle. The dried glaserite cake weighed 238 parts and contained 2.5 parts MSGE or 1.4% of input MSGE.

*Acid hydrolysis.*—To the filtrate, weighing 910 parts, were added 394 parts of 33% hydrochloric acid and the mixture was heated for 1½ hours under reflux conditions (108° C.). At the end of this time, the distillation was changed from total reflux to total takeoff of distillate, and the boiling was continued for 1½ hours until 200 parts of distillate had been collected. The hydrolyzate was then cooled to 30° C. and filtered to remove the humin.

*First co-neutralization.*—The alkaline hydrolyzate was mixed with crude glutamic acid repulp water from a previous cycle and adjusted to pH 5.1 by adding all of the wet humin cake and 150 parts of the filtered acid hydrolyzate. The humin was filtered from the resulting mixture, washed with 200 parts of aqueous 5% sodium chloride solution, and discarded. The humin filtrate and wash water were mixed with 80 parts of aqueous 10% tanning solution, agitated for one-half hour, and filtered. The tannin cake was washed with 200 parts of aqueous 5% sodium chloride solution and discarded.

The tannin filtrate and wash liquor were combined and concentrated under reduced pressure to 1,565 parts. During this procedure, inorganic solids comprising largely sodium chloride crystallized from solution. These solids were removed by filtration, washed with 150 parts of water, and rejected.

*Final co-neutralization.*—The inorganic filtrate and wash liquor were combined and reconcentrated to 1,092 parts (about 82% solids content). The concentrate was adjusted to pH 3.3 with the filtered acid hydrolyzate, and the resulting liquid was allowed to stand for 5 days, during which time glutamic acid crystallized therefrom. The glutamic acid crystals were removed by filtration, repulped with purified glutamic acid filtrate from a preceding cycle, and refiltered. The first filtrate, ordinarily designated as "glutamic acid end liquor," was withdrawn for treatment by means not connected with the present invention for recovery of the glutamic acid values therein. The second filtrate, ordinarily designated as "crude glutamic acid repulp water," was saved for addition to the alkaline hydrolyzate in a subsequent cycle.

*Glutamic acid purification.*—The wet repulped glutamic acid was dissolved in a mixture of 500 parts of water and 83 parts of aqueous 50% sodium hydroxide solution. The resulting solution of monosodium glutamate was decolorized by adding 20 parts of decolorizing carbon, heating to 60° C. for one-half hour, and filtering off the carbon. The carbon cake was washed with 50 parts of water. The filtrate and wash water were combined and adjusted to pH 3.2 with 103 parts of 37% hydrochloric acid. Glutamic acid crystallized from the solution overnight. The purified glutamic acid was filtered off and washed with 50 parts of water. The combined filtrate and wash water was reserved for use in repulping the crude glutamic acid in a subsequent cycle. The purified glutamic acid was dried.

*Material balance.*—The MSGE recovery and loss data for the foregoing cycle are given in the following table. The input values have been adjusted to take into account the slight differences between the recycle streams into and out of the described cycle.

| Stream or component | Total quantity, parts | MSGE content | |
|---|---|---|---|
| | | Parts | Percent of input |
| CSF | 2,004 | 193.5 | |
| (Recycle adjustment) | | −3.8 | |
| Net input | | 189.7 | 100.0 |
| Glaserite | 238 | 2.5 | 1.4 |
| Humin | 65 | 0.4 | 0.2 |
| Tannin | 20 | 0.0 | 0.0 |
| Inorganics | 252 | 1.9 | 1.0 |
| End liquor | 1,200 | 26.4 | 13.9 |
| Carbon | 27 | 0.0 | 0.0 |
| GA | 131 | 156.1 | 82.4 |
| | | 187.3 | 98.9 |

While I have described my invention by specific reference to Steffen's filtrate, it is to be understood that it is broadly suitable for processing liquors containing glutamic acid mother substances, including beet sugar waste liquors in general, such as thin barium filtrate, vinasse, schlempe, and the like, and mixtures thereof. I may advantageously employ one stock (e.g., Steffen's filtrate) for alkaline hydrolysis and a different stock (e.g., vinasse) for acid hydrolysis. It is possible to employ my invention to obtain glutamic acid from proteins, such as corn gluten, wheat gluten, casein, or the like, either alone or in conjunction with beet sugar waste liquors; however, the results are distinctly inferior, since alkaline hydrolysis of proteins tends to racemize the glutamic acid values, and acid hydrolysis of proteins yields a complex mixture of amino acids which contaminate the glutamic acid.

Likewise, while I have described my invention in connection with a detailed "co-neutralization" process, employing both acid and alkaline hydrolysis of starting material, it is to be understood that the invention is also novel and useful in connection with a process employing acid hydrolysis alone, with simple addition of alkali to fraction B, referred to above, to effect the first pH adjustment to pH 4–6, then making the final pH adjustment with fraction A.

Other modifications and equivalents of the invention will be apparent to those skilled in the art from the foregoing description.

In accordance with the present description, I claim as my invention:

1. In a process for recovering glutamic acid from a sugar beet waste liquor wherein said waste liquor is admixed with a non-oxidizing mineral acid and subjected to hydrolysis to convert the glutamic acid mother substances therein into glutamic acid, a portion of the hydrolyzate is adjusted to a pH in the range of about 4 to about 6 and is concentrated and desalted within said range, the desalted hydrolyzate is acidified to a pH around 2.5 to 3.5 with a sufficient quantity of the acidic hydrolyzate, and glutamic acid is crystallized therefrom, the improvement wherein said hydrolysis is initiated at a dissolved solids level below 60% by weight, and at least a portion of the hydrolysis mixture, sufficient for the acidification to around pH 3.2, is subjected to concentration under hydrolysis conditions to a solids level above 60% and below about 85% by weight.

2. A process as in claim 1 wherein said beet sugar waste liquor is Steffen's filtrate.

3. A process as in claim 1 wherein said beet sugar waste liquor is a barium filtrate.

4. A process as in claim 1 wherein said beet sugar waste liquor is a fermentation residue.

5. A process for recovering glutamic acid from Steffen's filtrate which comprises hydrolyzing a portion of Steffen's filtrate by heating with a non-oxidizing mineral acid, at a pH below about 1 and a temperature between about 100 and about 125° C. for a period of about ¼ to about 4 hours and concentrating under said conditions to a solids content between about 60 and about 85% by weight, dividing the acid hydrolyzate into fractions A and B, fraction A comprising between about 20 and about 80% of the hydrolyzate liquor substantially free from insoluble material, and fraction B comprising the remaining hydrolyzate liquor and substantially all of the insoluble material originally contained in said acid hydrolyzate, hydrolyzing another portion of Steffen's filtrate under alkaline conditions, commingling the resulting alkaline hydrolyzate with a sufficient quantity of fraction B to give a pH between about 4 and about 6, separating insoluble material therefrom, concentrating the resulting liquid to a solids content between about 65 and about 85% by weight, crystallizing and separating inorganic salts therefrom, commingling the resulting liquid with a sufficient quantity of fraction A to give a pH of about 3.2, and crystallizing glutamic acid from the resulting solution.

6. A process for recovering glutamic acid from Steffen's filtrate which comprises hydrolyzing a portion of Steffen's filtrate by heating with hydrochloric acid at a pH of about 0 and a temperature of about 125° C. for about 2 hours while simultaneously concentrating to a solids content of about 65% by weight, dividing the acid hydrolyzate into fractions A and B, fraction A comprising between about 30 and about 70% of the hydrolyzate liquor substantially free from insoluble material, and fraction B comprising the remaining hydrolyzate liquor and substantially all of the humin and other insoluble material originally contained in said acid hydrolyzate, hydrolyzing another portion of Steffen's filtrate by heating with sodium hydroxide solution, commingling the alkaline hydrolyzate with a sufficient quantity of fraction B to give a pH between about 4.5 and about 5.5, separating insoluble material therefrom, concentrating the resulting liquid to a solids content of about 80% by weight, crystallizing and separating inorganic salts therefrom, adding to the resulting liquid a sufficient quantity of fraction A to give a pH of about 3.2, and crystallizing glutamic acid from the resulting solution.

7. In a process for recovering glutamic acid from a sugar beet waste liquor wherein a portion of said waste liquor is admixed with a non-oxidizing mineral acid and subjected to hydrolysis to convert the glutamic acid mother substances therein into glutamic acid, insoluble material is separated from at least a portion of the acid hydrolyzate, another portion of said waste liquor is subjected to hydrolysis under alkaline conditions, alkaline hydrolyzate is commingled with acid hydrolyzate in a proportion to give a pH between about 4 and about 6, the resulting mixture is concentrated to a solids content above about 65% by weight, inorganic salts are crystallized and separated therefrom, the desalted liquor is commingled with a sufficient quantity of insolubles-free acid hydrolyzate to give a pH around 2.5 to 3.5, and glutamic acid is crystallized therefrom, the improvement wherein the acid hydrolysis is initiated at a dissolved solids level below 60% by weight, and the acid hydrolysis mixture is subjected to concentration under acid hydrolysis conditions to a solids level above 60% and below about 85% by weight, whereby the required extent of concentration at pH 4–6 is minimized.

References Cited in the file of this patent

UNITED STATES PATENTS

| 2,241,927 | Sahyun | May 13, 1941 |
| 2,525,902 | Hoglan et al. | Oct. 17, 1950 |
| 2,788,368 | Purvis | Apr. 9, 1957 |